(12) United States Patent
Lotz

(10) Patent No.: US 8,343,417 B2
(45) Date of Patent: Jan. 1, 2013

(54) OXYGEN STRAND CUTTING MACHINE

(75) Inventor: Horst K. Lotz, Hofheim-Wallau (DE)

(73) Assignee: Aute AG Gesellschaft Für Autogene Technik, Hauterive NE (CH)

( * ) Notice: Subject to any disclaimer, the term of this patent is extended or adjusted under 35 U.S.C. 154(b) by 184 days.

(21) Appl. No.: 12/741,891

(22) PCT Filed: Dec. 22, 2008

(86) PCT No.: PCT/EP2008/011044
§ 371 (c)(1),
(2), (4) Date: Sep. 13, 2010

(87) PCT Pub. No.: WO2009/086913
PCT Pub. Date: Jul. 16, 2009

(65) Prior Publication Data
US 2010/0327497 A1 Dec. 30, 2010

(30) Foreign Application Priority Data
Jan. 9, 2008 (DE) .......................... 10 2008 003 717

(51) Int. Cl.
*B23K 7/00* (2006.01)
(52) U.S. Cl. .......................................... 266/50; 266/48
(58) Field of Classification Search ..................... 266/48, 266/51, 50
See application file for complete search history.

(56) References Cited

U.S. PATENT DOCUMENTS

| | | | | |
|---|---|---|---|---|
| 2,511,591 | A | 6/1950 | Keller | |
| 6,219,894 | B1 * | 4/2001 | Lotz | 29/33 A |
| 6,277,322 | B1 * | 8/2001 | Lotz | 266/51 |
| 6,367,718 | B1 * | 4/2002 | Lotz | 239/556 |

FOREIGN PATENT DOCUMENTS

| | | |
|---|---|---|
| DE | 906533 C | 3/1954 |
| DE | 102006020415 A1 | 11/2007 |
| EP | 0516199 A1 | 12/1992 |

* cited by examiner

*Primary Examiner* — Scott Kastler
(74) *Attorney, Agent, or Firm* — The Webb Law Firm

(57) ABSTRACT

An oxygen strand cutting machine for flame-cutting cast cold and hot slugs, steel blocks and slabs in and after continuous steel casting units comprising: a crane tower; and a boom erected perpendicularly to the continuous casting direction, whereon one or two torch carriages with flame cutters are perpendicularly movable with respect to the cast strand, wherein the crane tower is permanently fixed to the cast strand and includes an articulated arm horizontally pivoting in a set angular sector, on which the boom is rotatably and horizontally mounted, wherein the boom is movably connected to a lifting carriage movable along the articulating arm or the boom and the boom is fitted with roller bearings around which the boom is pivotable to be situated perpendicularly to the continuous casting direction during flame cutting via digital programming, and wherein the articulated arm simultaneously houses driving means, a cooling water supply, and power and control cables as a common line.

11 Claims, 3 Drawing Sheets

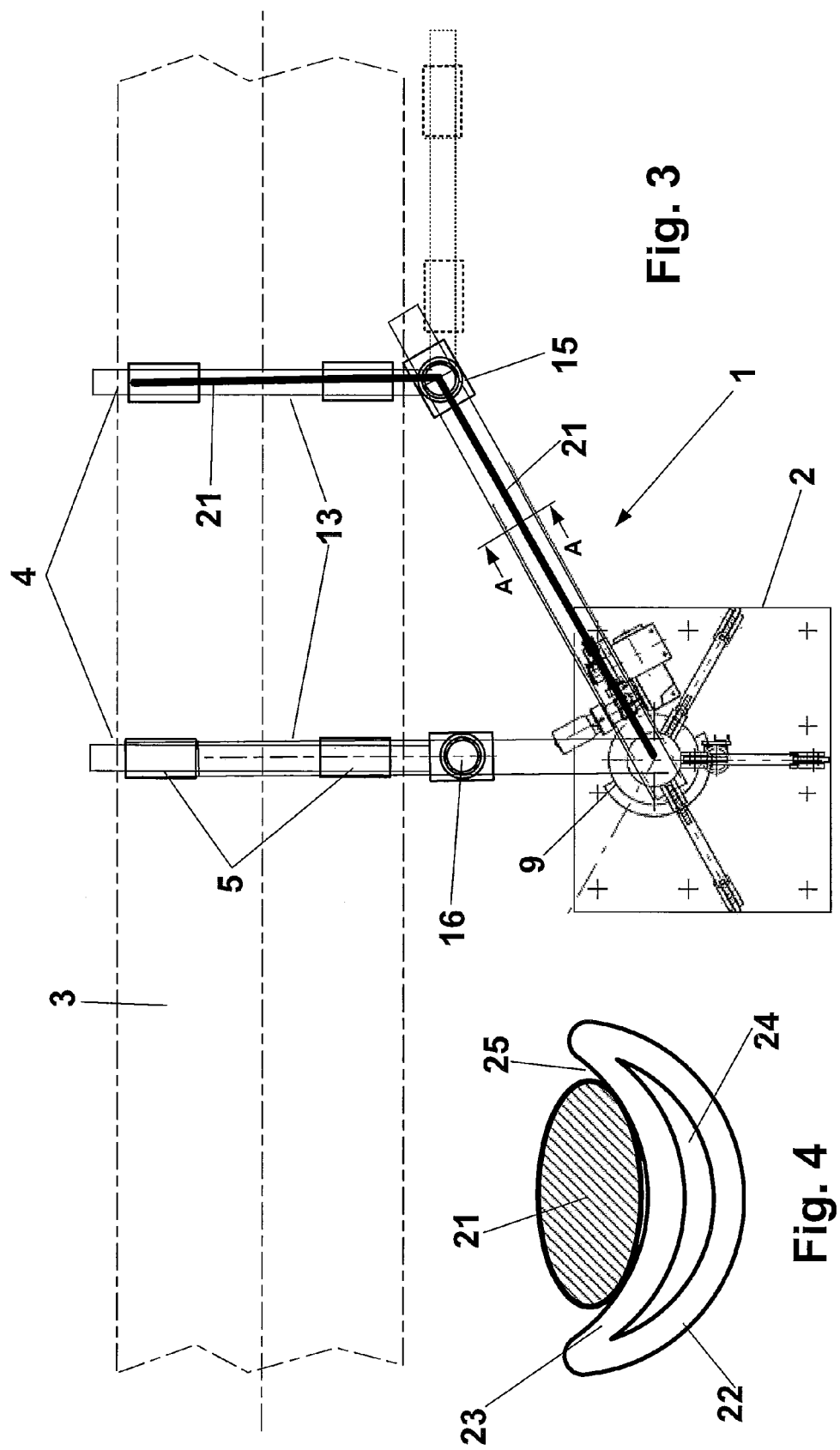

OXYGEN STRAND CUTTING MACHINE

BACKGROUND OF THE INVENTION

1. Field of the Invention

The invention relates to an oxygen strand cutting machine for flame-cutting cast cold and hot slugs, steel blocks and slabs in and after continuous steel casting units with a crane tower and a boom arranged perpendicular to the continuous casting direction, whereon one or two torch carriages with flame cutters are mobile perpendicular to the cast strand.

2. Description of Related Art

Continuously cast steel strands in continuous casting units should be cut for further treatment in transportable lengths corresponding to the finished products. These predominantly hot slugs, blocks or slabs are separated usually by oxygen flame cutters in an oxygen strand cutting machine. In such an oxygen strand cutting machine an oxygen cutting beam transforms the steel brought to ignition temperature into an outflowing oxygen sullage and generates a seam, which grows into a cut when moving.

In most well-known embodiments of continuous flame cutting machines, these are robust portal-type machine casings made of heavy profiles and steel plates welded together, predominantly of portal type, protected with water plates against the intense heat generated from the strand, mobile on two rails arranged on both sides of the strand. A so-called slide way intended for the torch carriages by this portal carries the substantially non-protected torch carriages with the flame cutters and the hoses and cables provided, which are routed in hose and cable drag chains.

DE 10 2006 020 415.8 describes an oxygen strand cutting machine, composed substantially of a tower carriage arranged close to the part, i.e. close to the cast strand, mobile along the tower carriage with travelling mechanism, counterweight, lifting mechanism, electrical station, gas station, vertical carriages and of another tower fitted with hinges for pivoting a boom in the form of a frame, mounted rotatably, whereon one or two torch carriages inserted in cooling jackets filled with circulating water and fitted with flame cutters are mobile perpendicular to the part.

Should repair or maintenance works be necessary to the continuous flame cutting unit, operating failures of all kinds may cause the unit to shut down, which may involve enormous cost and time wasted. The staff assigned to repair and maintenance may be exposed to injuries to variable degrees due to the immediate proximity of the hot strand and of the inevitable heat radiation. To avoid such a situation and to be able to conduct maintenance work, the boom of the oxygen strand cutting machine can be retracted horizontally from the roller positioner of the cast strand, so that the arms are parallel to the continuous casting direction.

DE 10 2006 020 415.8 also shows that the tower carriage fitted with wheels and a travelling mechanism is mobile on relative long rails forming a track, anchored to corresponding foundations. Such foundations provided with rails involve a lot of technical means and are very expensive, since they have to absorb many loads and pressures.

DE 36 07 027 A1 divulges a device for flame cutting of metal scrap and waste, exhibiting a column, containing a carriage and a boom, fitted with a burner and a pivoting system for pivoting said boom. The carriage fitted with the boom hangs from the column on a flexible sheathed cable. One end of the sheathed cable is connected to a driving means of the carriage on the column, and the other end is attached to the boom using a diversion member, so that the boom is also subjected to a torque relation to its pivot axis. It also shows that the column fitted with wheels in mobile on a rail track perpendicular to the cutting direction of the torch. Still this rail track proves quite detrimental inasmuch as it involves enormous means and expenses connected to its foundations. Moreover, cutting perpendicular to the part is possible only when moving the column on the rails.

SUMMARY OF THE INVENTION

The invention intends to provide an oxygen strand cutting machine of the type aforementioned, thereby saving means and costs on mobile installations while securing synchronisation of the torches perpendicular to the continuous casting direction during flame cutting.

The object of the invention is met inasmuch as the crane tower is fixed permanently to the cast strand and exhibits an articulated arm pivoting horizontally in a set angular sector, on which the boom is mounted rotatably and horizontally, whereas the arm is connected to a lifting carriage mobile along the articulated arm and/or the boom and fitted with roller bearings, around which the boom may pivot in such a way that it is always arranged perpendicular to the continuous casting direction during flame cutting thanks to digital programming and that the articulated arm houses simultaneously the driving means and possibly the cooling water supply as well as the power and control cables.

The fixed crane tower close to the cast strand enables first of all to dispense with the foundations fitted with rails, which involve a lot of technical means and are very expensive and whereon the whole oxygen strand cutting machine should run with its full weight, all devices and additional systems. These foundations fitted with rails account for a major portion of the costs of the continuous steel casting units so that significant costs can be saved.

The articulated arm arranged on the crane tower pivots with a corresponding electro-motorised, hydraulical or pneumatical drive on a horizontal plane in an angular sector of at last 90° over the cast strand so that the torch carriages may travel perpendicular to the continuous casting direction over the whole width of the cast strand during flame cutting.

A lifting carriage is mobile over the articulated arm or the boom and includes a roller bearing linking the articulated arm with the boom on a horizontal rotary plane. The fulcrum of the articulated arm and of the boom is thus situated on the lifting carriage. Thus the articulated arm and the boom form a pair of articulations. The numerical control of the lifting carriage during the flame cutting cycle guarantees that the boom and hence the torch carriages with the flame cutters always form a right angle to the continuous casting direction, which is necessary for right-angle cutting of the cast strand.

Moreover the articulated arm is used simultaneously for accommodating a common line for the operating means and possibly the cooling water supply as well as the power cables and control cables for cutting media, such as oxygen, combustion gas and cutting gas, as well as electrical lines and possibly cooling water for in particular the boom and/or the torch carriages.

Another advantage of the oxygen strand cutting machine according to the invention lies in that no building intensive machine tower nor tower carriage are necessary, which should include transport members such as wheels or travelling mechanisms along an oxygen strand cutting machine mobile along the cast strand, in order to run over rail foundations.

Further embodiments of the invention can be found in the sub-claims.

It can thus be provided that the boom is retractable outside the cast strand for repairing or maintenance purposes. This means that the size of the sweeping angular sector of the articulated arm is designed so that the articulated arm can swing out together with the boom, so that they can be arranged for instance parallel to the continuous casting direction. Thus the articulated arm and the boom lie outside the heat and danger zone of the cast strand so that maintenance and repair works can be carried out more easily. The execution as a swing boom enables rapid and reliable maintenance, corresponding repairs and replacement of all parts in and on the boom such as nozzles, torches, hoses, torch carriages, torch carriage sections and common lines.

According to another embodiment of the oxygen strand cutting machine the lifting carriage is mobile preferably on wheels on the upper side of the articulated arm or of the boom. Preferably the lifting carriage may have wheels or pairs of wheels in its upper section and possibly in its lower section and beak away for example on the uppermost horizontal tubes of the boom in the form of a tubular scaffold or of the articulated arm.

Moreover the crane tower exhibits a vertical column on which the articulated arm is formed rotatably and the column with cable, chain, toothed rack, lifting piston cylinder or similar for lifting and lowering the boom is provided adjustable in height. To do so all the articulation points are extremely stable and free from backlash, so as to prevent any twist once the boom has been set.

Besides the column of the crane tower can be provided rotary. Thus any horizontal sweep of the boom for instance for maintenance and repair purposes towards the outside of the cast strand will be supported.

Additionally elements necessary to flame-cutting such as flame cutters, motorised cutting driving mechanism with transmission and electric motor, brackets for the common line, as well as gas control parts, like valves, measuring instruments as well as edge sensors and limit switches are arranged on the boom.

Moreover the boom is fitted with a thermal insulation and slip-on rockers for the cast strand. Preferably the boom consists of a lattice-type construction in the form of a frame, filled with cooling water for thermal insulation. Unlike other well-known continuous flame cutting machines the boom has an open-ended tubular construction, which is solid and maintenance friendly. The execution as a tubular construction, filled with water, of the oxygen strand cutting machine prevents any superfluous heating or even overheating of the bearing components and reduces any still necessary thermal protection for the torch carriages and the service and energy common lines and hence the whole quantity of necessary cooling water.

Moreover a rotary drive mechanism, a lifting mechanism, an electrical station, a gas station and possibly further control members are arranged substantially on the crane tower.

According to another embodiment of the articulated arm of the oxygen strand cutting machine said arm consists of two semi-tubes nested into one another and welded, whose cavity in the form of a moon-crescent serves as a cooling water chamber and the superimposed semi-circular free space for accommodating the common line. The common line is provided with an additional length over the articulation axes, which enables trouble-free deviation of the articulated arm and of the boom. The circuit of the common line in the semi-circular free space above the cooling water chamber is particularly advantageous. Consequently, separate cooling of the common line, which would involve considerable technical means and expenses, can be dispensed with. Moreover, there is no need for separate guide rolls and rods for guiding the common line any longer.

BRIEF DESCRIPTION OF THE DRAWINGS

The idea behind the invention will be illustrated more in detail in the following description using embodiments shown in the various drawings. The figures are as follows.

DETAILED DESCRIPTION OF THE INVENTION

Figure 1:
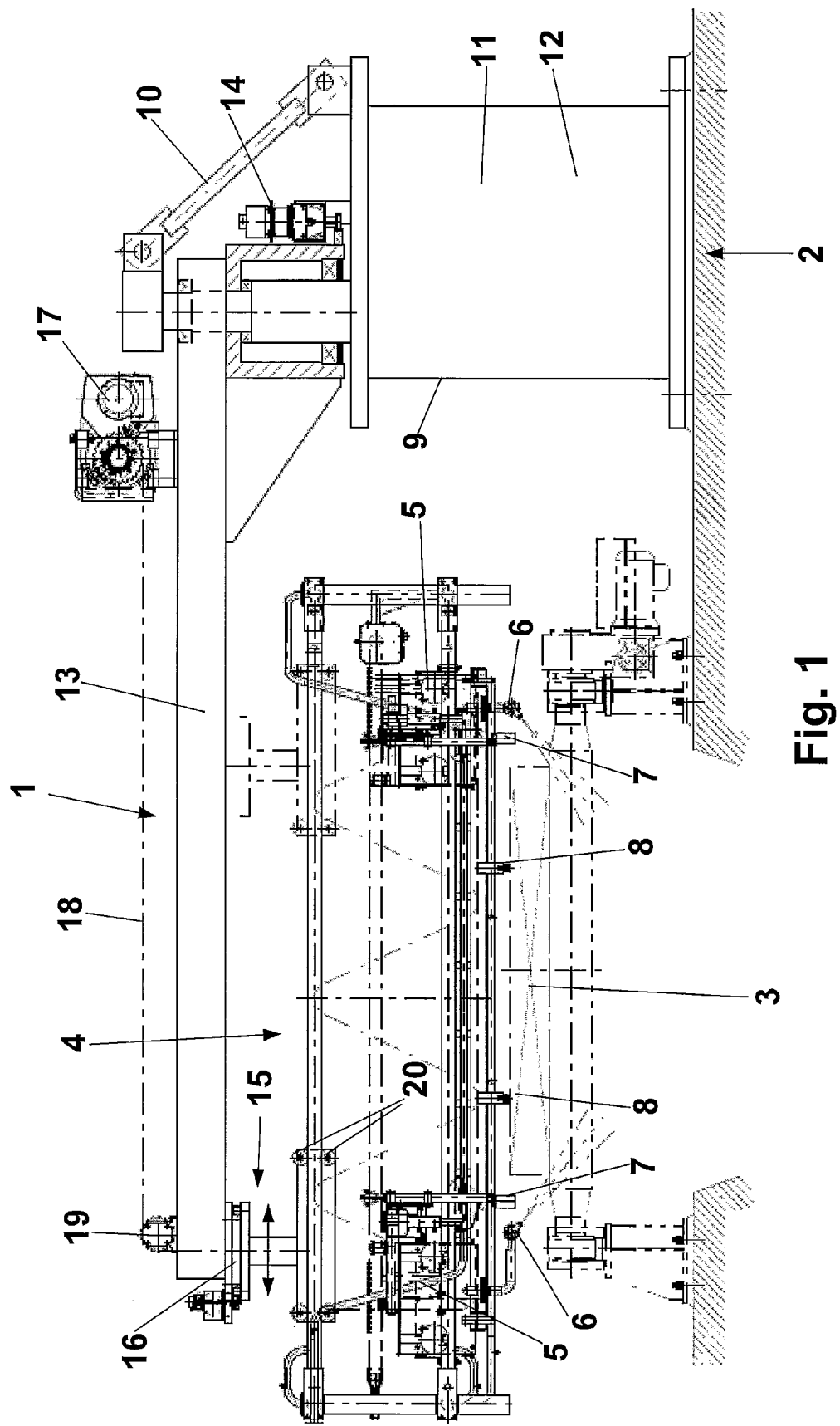
FIG. 1 is a side view of the oxygen strand cutting machine according to the invention in a first embodiment, FIG. 2 a top view of the oxygen strand cutting machine according to FIG. 1, FIG. 3 a top view of the oxygen strand cutting machine in a second embodiment, and FIG. 4 a cross-sectional view of the articulated arm along the line A-A according to FIG. 3.
Figure 2:
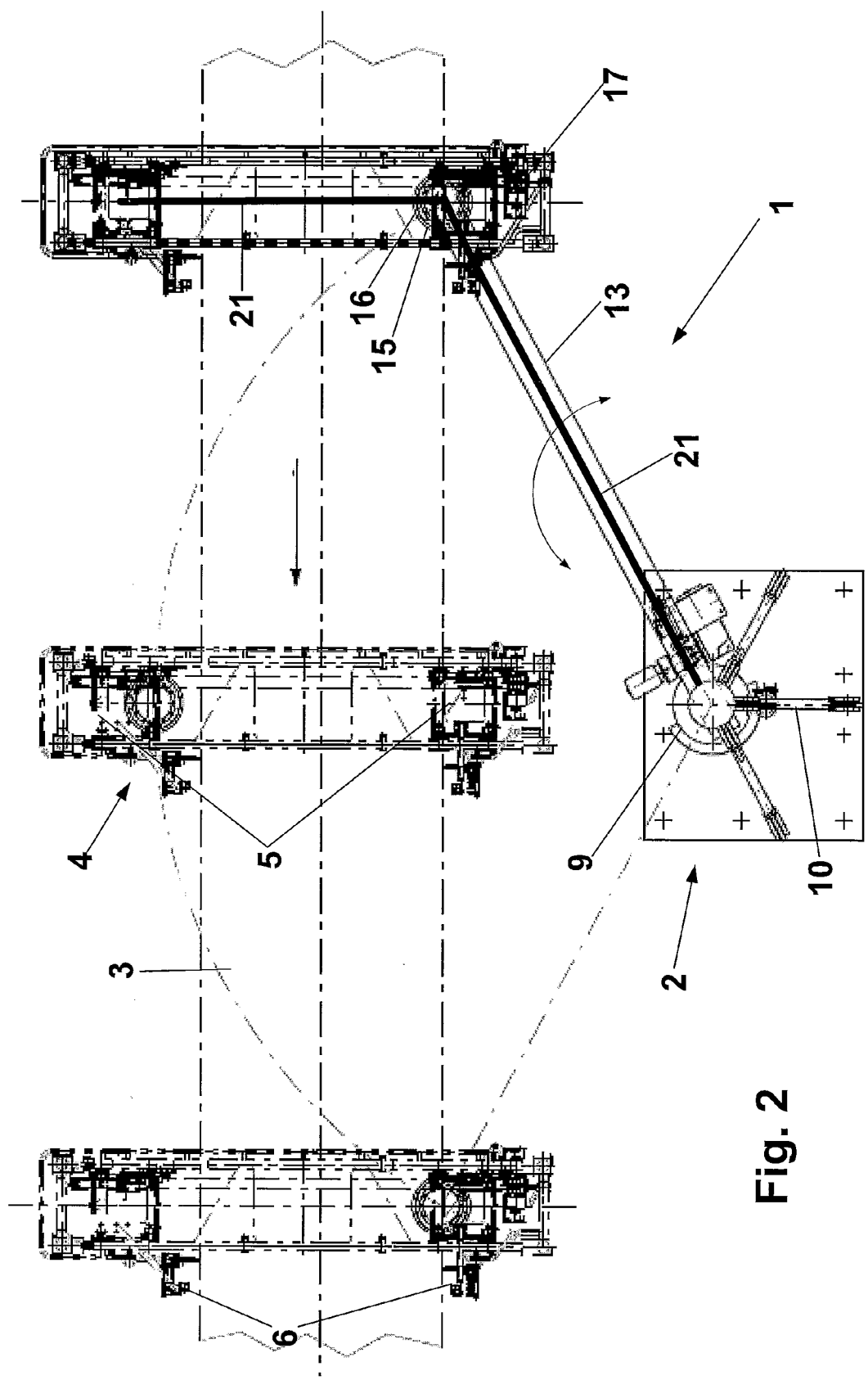

The oxygen strand cutting machine 1 according to FIGS. 1 and 2 consists of main assemblies including a crane tower 2 and a boom 4 erected perpendicular to the longitudinal direction of the cast strand 3, whereas one or two torch carriages 5 with flame cutters 6 are mobile perpendicular to the cast strand 3 on tracks. Moreover the boom 4 contains two edge sensors 7, spaced apart from one another and adjustable relative to the edges of the cast strand 3 as well as two spaced apart from one another slip-on rockers 8 to be slipped on the cast strand 3. The boom 4 consists of an open-ended lattice-type construction in the form of a frame, filled with cooling water for thermal insulation.

The crane tower 2 is fixed rigidly close to the cast strand 3. Moreover the crane tower 2 possesses a vertical and possibly rotary column 9, which is adjustable in height using a lifting piston cylinder 10, for raising and lowering the boom 4. The crane tower 2 houses at least one electrical station 11 and one gas station 12.

Between the crane tower 2 and the boom 4 is provided an articulated arm 13, rotatably, able to sweep horizontally in a set angular sector and linking both elements, so that the boom 4 is articulated and rotatably horizontally against said arm. A rotary drive mechanism 14 enables to swing the articulated arm 13 around the preset angular sector. During flame cutting the boom 4 is always erected at right angle to the longitudinal direction of the cast strand 2 thanks to an NC-operating system.

A lifting carriage 15 is provided between the boom 4 and the articulated arm, including a roller bearing 16, capable of rotating via a lifting carriage drive mechanism 17 and for instance a toothed rack 18 and a toothed gear 19, to secure the right angle of the boom 4 relative to the longitudinal direction of the cast strand 23 during flame cutting. The lifting carriage 15 is fitted with pairs of wheels 20, running along the upper frame of the boom 4, so that the lifting carriage 15 may travel longitudinally along the articulated arm 13 and the boom 4. The longitudinally mobile lifting carriage 15 fitted with the rotary roller bearing 16 is connected with the boom 4, so that during flame cutting said boom is always erected at right angle to the longitudinal direction of the cast strand thanks to an NC-operating system.

As shown diagrammatically on FIGS. 2 and 3 by the bold line, the articulated arm 3 and the boom 4 in its extension support simultaneously the operating means and possibly the cooling water supply as well as power cables and control cables as flexible common line 21.

The diagrammatically illustrated embodiment of the oxygen strand cutting machine 1 according to FIG. 3 shows that the lifting carriage 15 slides exclusively on the articulated arm 13 and not of the boom 4. Accordingly to the degree of sweep of the articulated arm 13 the lifting carriage 15 slides thereon back and forth. In this variation, during flame cutting the boom 4 is always erected at right angle to the longitudinal direction of the cast strand 3 thanks to the NC-operating system. FIG. 3 also show in dotted lines that the boom 4 can be swung via the articulated arm 13 towards the outside of the cast strand 3, for instance for maintenance and repair purposes. The boom 4 can be swung out by the articulated arm 13 and/or the rotary column 9.

FIG. 4 shows a cross-sectional view of the articulated arm 13 along the line A-A according to FIG. 3. The articulated arm 13 consists of two semi-tubes 22 and 23 nested into one another and welded. The cavity 24 in the form of a moon crescent serves as a cooling water chamber for storing and conveying cooling water for the boom 4 filled with cooling water. The superimposed semi-circular free space 25 on the other hand is provided for accommodating the common line 21.

The invention claimed is:

1. An oxygen strand cutting machine for flame-cutting cast cold and hot slugs, steel blocks and slabs in and after continuous steel casting units, the oxygen strand cutting machine comprising:
a crane tower permanently fixed near a cast strand;
an articulated arm mounted on the crane tower and horizontally pivotable in a set angular sector;
a boom rotatably and horizontally mounted to the articulated arm and movably connected to a lifting carriage movable along the articulating arm such that the boom is erectable perpendicularly to a continuous casting direction; and
one or two torch carriages with flame cutters provided on the boom and perpendicularly movable with respect to the cast strand,
wherein the boom is fitted with roller bearings around which the boom is pivotable to be situated perpendicularly to the continuous casting direction during flame cutting via digital programming, and wherein the articulated arm simultaneously houses driving means, a cooling water supply, and power and control cables as a common line.

2. The oxygen strand cutting machine according to claim 1, wherein the articulated arm is sweepable over an angle of at least 90° over the cast strand.

3. The oxygen strand cutting machine according to claim 1, wherein the boom is retractable towards an outside of the cast strand for repairing or maintenance of the boom.

4. The oxygen strand cutting machine according to claim 1, wherein the lifting carriage is mobile via wheels situated on an upper side of the articulated arm.

5. The oxygen strand cutting machine according to claim 1, wherein the crane tower includes a vertical column, on which the articulated arm is rotatably formed and wherein the vertical column has a cable, chain, toothed rack, or lifting piston cylinder for lifting and lowering the height of the boom.

6. The oxygen strand cutting machine according to claim 5, wherein the vertical column of the crane tower is rotatable.

7. The oxygen strand cutting machine according to claim 1, wherein flame cutters, a motorised cutting driving mechanism with transmission and electric motor, a bracket for the common line, and gas control parts including valves, measuring instruments, edge sensors, and limit switches are arranged on the boom.

8. The oxygen strand cutting machine according to claim 1, wherein the boom is fitted with a thermal insulation and slip-on rockers for the cast strand.

9. The oxygen strand cutting machine according to claim 8, wherein the boom includes an open-ended lattice-type construction in the form of a frame, filled with cooling water for thermal insulation.

10. The oxygen strand cutting machine according to claim 1, wherein a rotary drive mechanism, a lifting mechanism, an electrical station, and a gas station are arranged substantially on the crane tower.

11. The oxygen strand cutting machine according to claim 1, wherein the articulated arm includes two semi-tubes nested into one another and welded, wherein a resultant cavity in the form of a moon-crescent is a cooling water chamber and the resultant superimposed semi-circular free space accommodates the common line.

* * * * *